United States Patent
Ishizu

(10) Patent No.: US 10,333,783 B2
(45) Date of Patent: Jun. 25, 2019

(54) DATA PROCESSING APPARATUS, COMMUNICATION APPARATUS, AND CONTROL METHODS FOR THE SAME

(71) Applicant: CANON KABUSHIKI KAISHA, Tokyo (JP)

(72) Inventor: Akihiko Ishizu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 143 days.

(21) Appl. No.: 15/262,913

(22) Filed: Sep. 12, 2016

(65) Prior Publication Data
US 2017/0085425 A1  Mar. 23, 2017

(30) Foreign Application Priority Data

Sep. 17, 2015  (JP) ................................ 2015-184313

(51) Int. Cl.
| | |
|---|---|
| *H04L 12/26* | (2006.01) |
| *H04L 12/24* | (2006.01) |
| *H04W 8/00* | (2009.01) |
| *H04W 48/16* | (2009.01) |
| *H04W 76/10* | (2018.01) |
| *H04W 48/20* | (2009.01) |
| *H04L 12/28* | (2006.01) |

(52) U.S. Cl.
CPC .......... *H04L 41/0816* (2013.01); *H04L 12/28* (2013.01); *H04W 8/005* (2013.01); *H04W 48/16* (2013.01); *H04W 48/20* (2013.01); *H04W 76/10* (2018.02)

(58) Field of Classification Search
CPC ..... H04L 12/28; H04L 41/0816; H04L 67/14; H04W 8/005; H04W 48/20; H04W 76/14; H04W 48/16; H04W 76/10
USPC ................................ 370/230, 252, 328, 329
See application file for complete search history.

(56) References Cited

U.S. PATENT DOCUMENTS

| | | | |
|---|---|---|---|
| 2007/0120955 A1 | 5/2007 | Shimosato | 348/14.01 |
| 2007/0201363 A1 | 8/2007 | Narukawa et al. | 370/230 |
| 2014/0082207 A1* | 3/2014 | Kikuchi | H04L 67/14 709/228 |

(Continued)

FOREIGN PATENT DOCUMENTS

| | | |
|---|---|---|
| JP | 2007-166577 | 6/2007 |
| JP | 2007-215070 | 8/2007 |

*Primary Examiner* — Harun Chowdhury
(74) *Attorney, Agent, or Firm* — Venable LLP

(57) ABSTRACT

A data processing apparatus communicates with an external apparatus, using any of a plurality of communication manners including a first connection manner via a network and a second connection manner that is different from the first connection manner, searches for an external apparatus capable of executing a predetermined function, selects an external apparatus found in the search as a connection-target device, and controls such that, in a case where the selected external apparatus has been connected to previously and content data has been transmitted to the external apparatus previously, communication is performed with the external apparatus using the first connection manner, and controls such that, in a case where content data has not been transmitted to the external apparatus previously, communication is performed with the external apparatus using the second connection manner.

11 Claims, 12 Drawing Sheets

(56) References Cited

U.S. PATENT DOCUMENTS

2015/0036521 A1* 2/2015 Minamino ............ H04W 76/10
370/252
2015/0146241 A1* 5/2015 Lee ...................... H04W 76/14
358/1.15

* cited by examiner

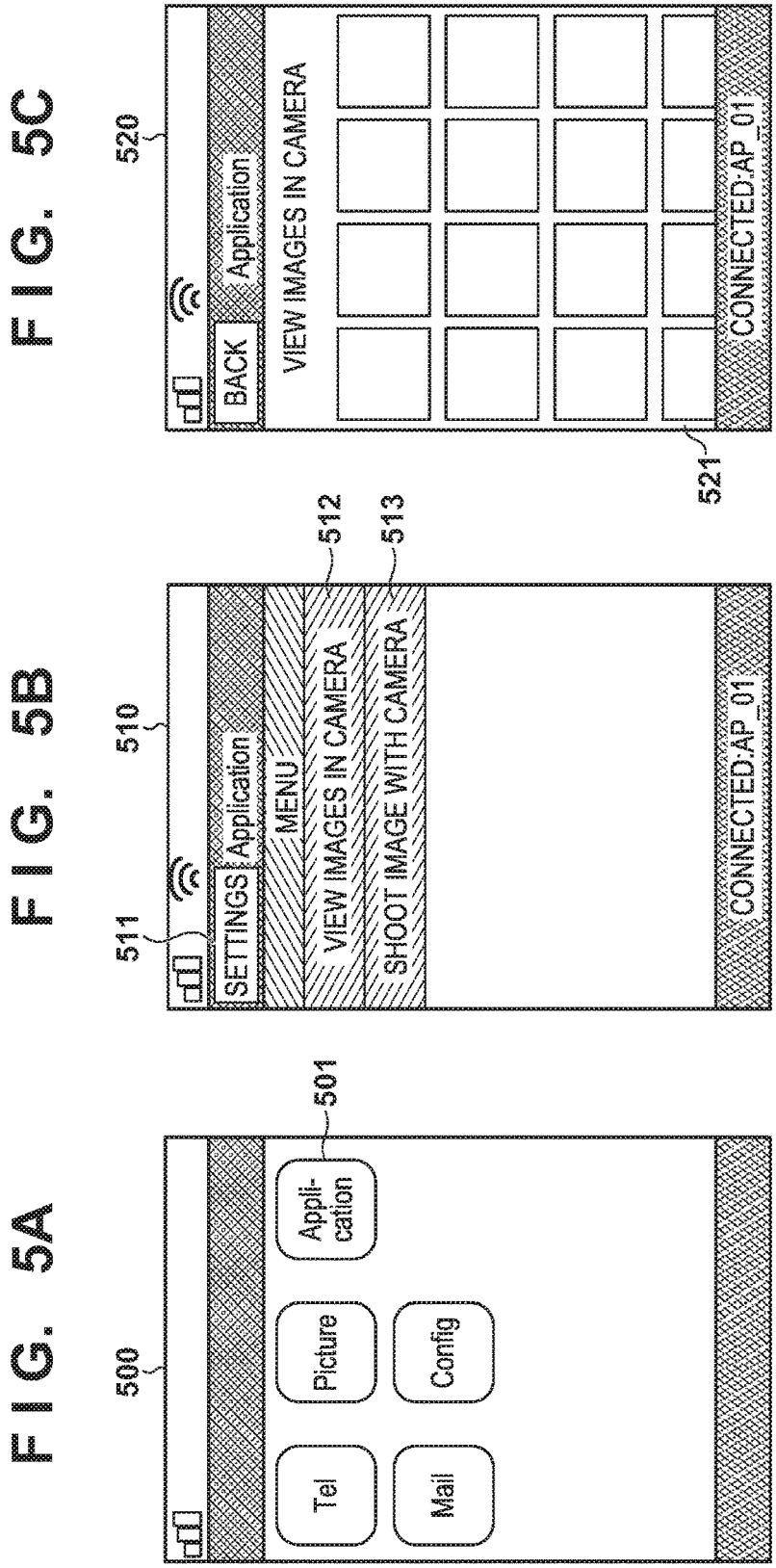

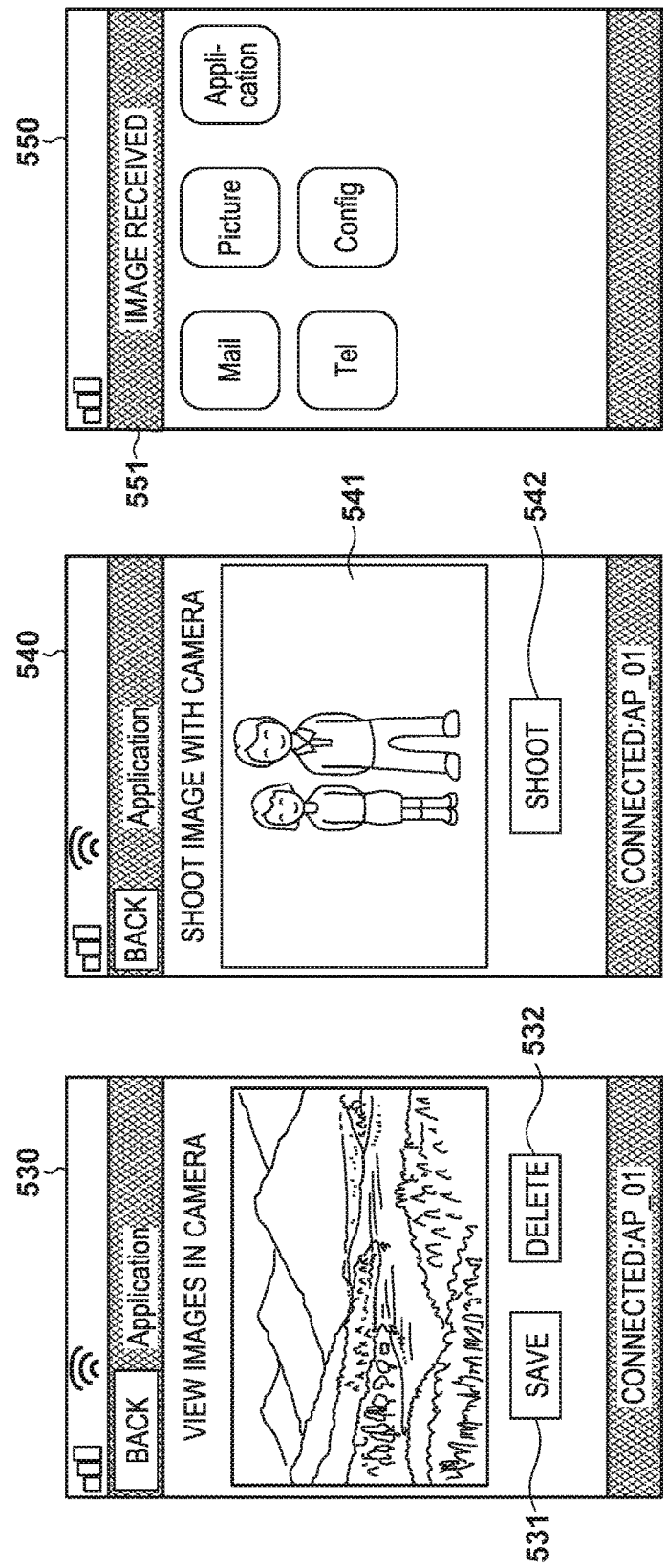

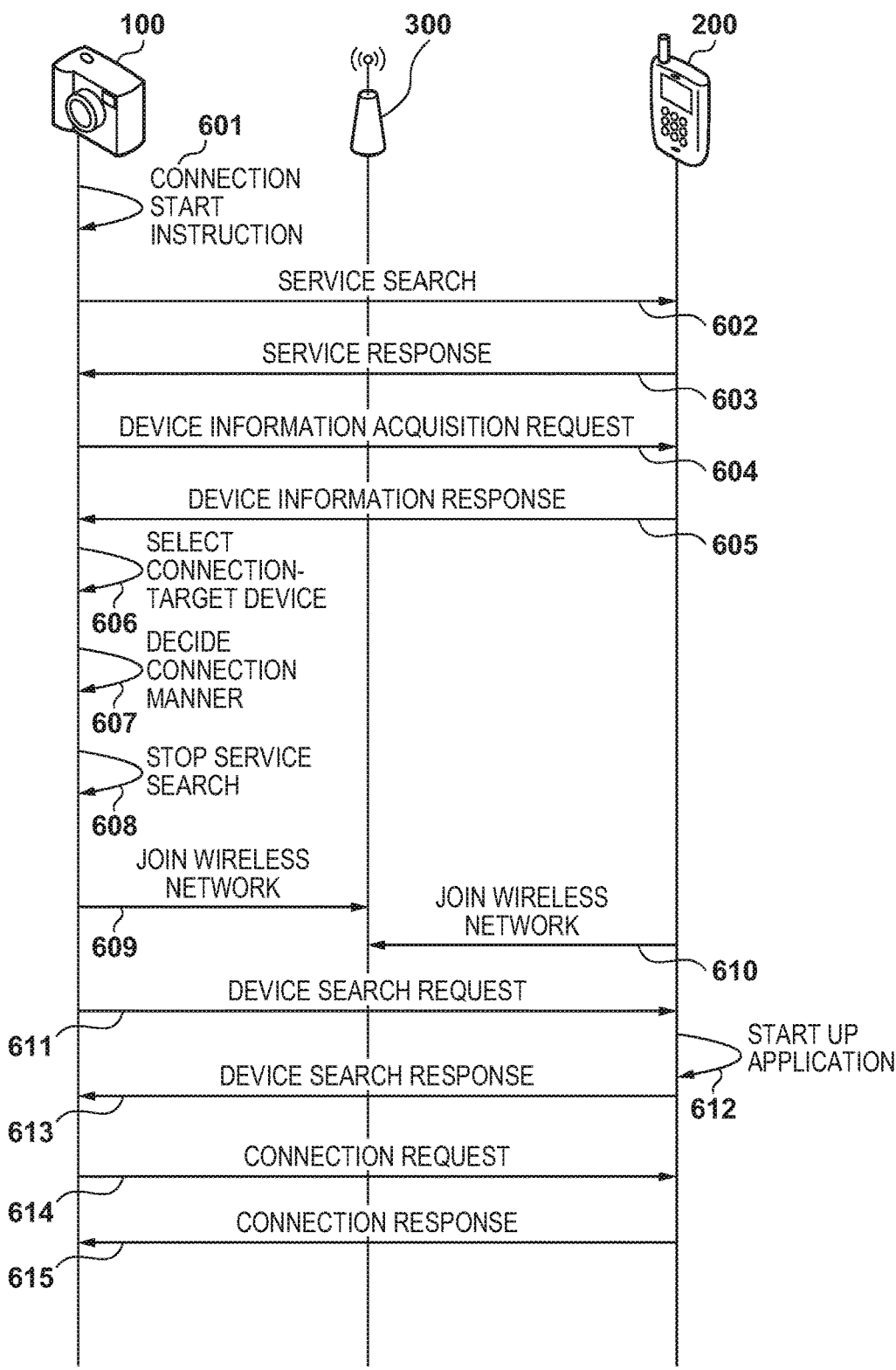

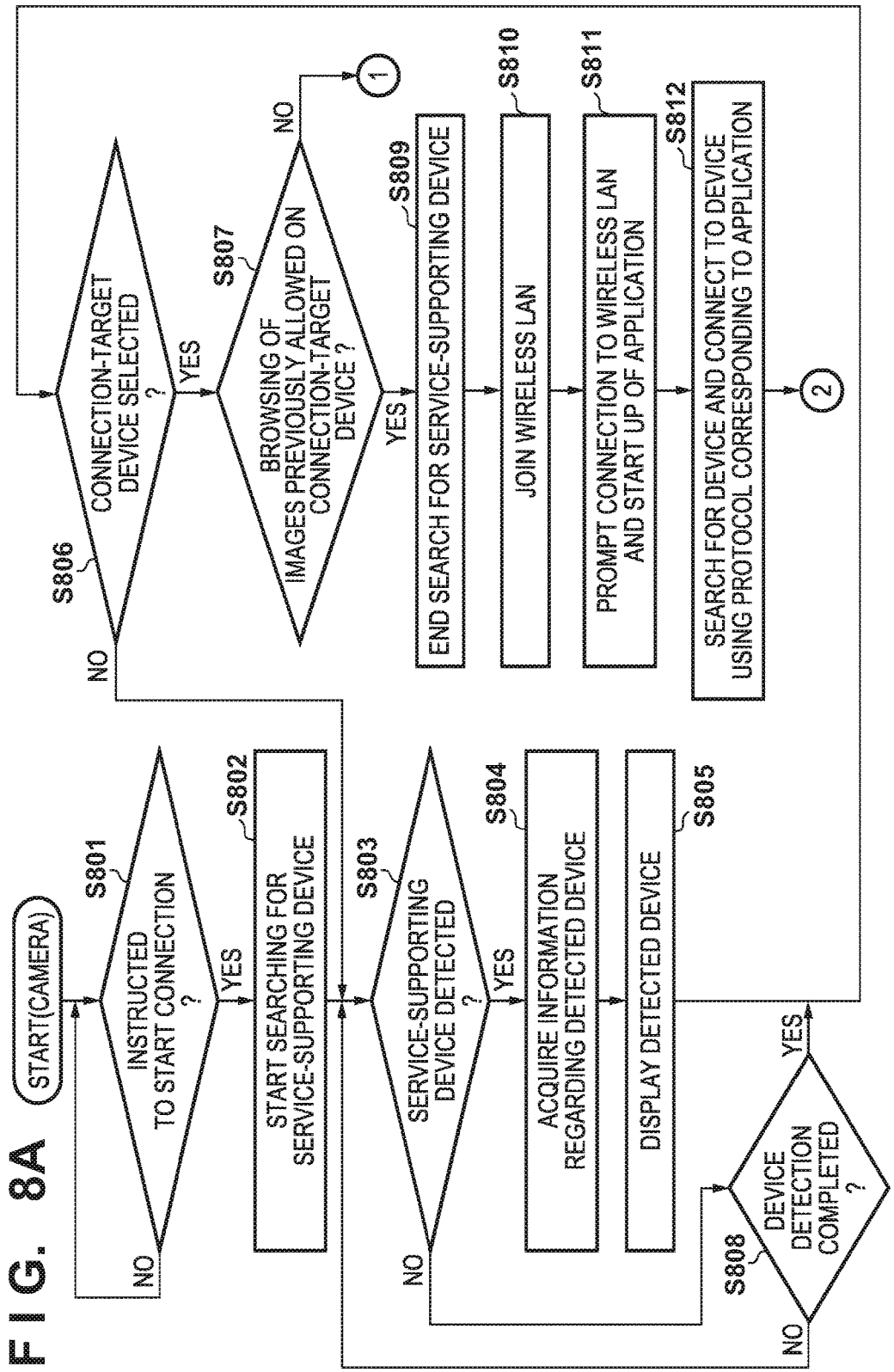

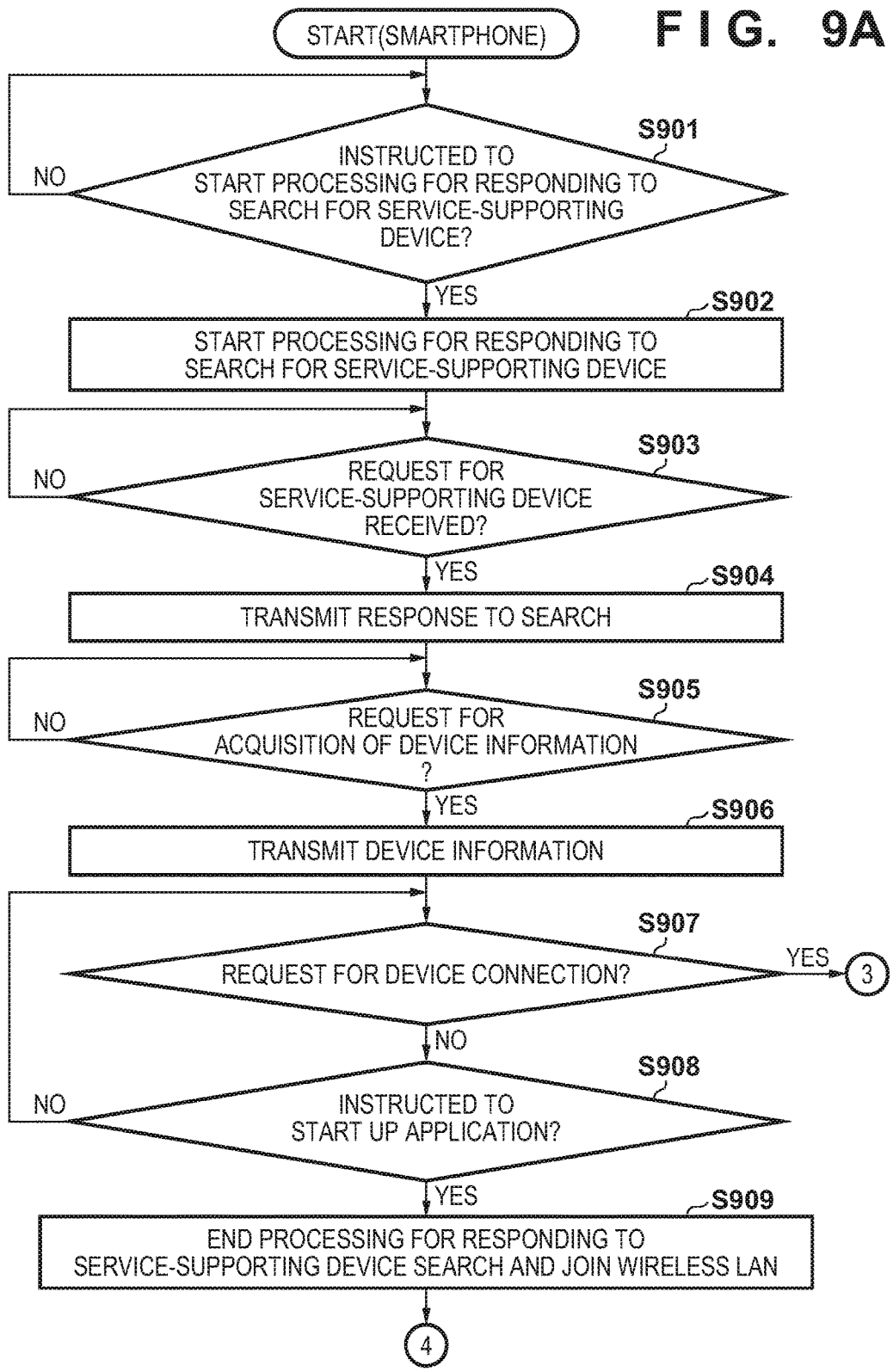

DATA PROCESSING APPARATUS, COMMUNICATION APPARATUS, AND CONTROL METHODS FOR THE SAME

BACKGROUND OF THE INVENTION

Field of the Invention

The present invention relates to a communication control technique that involves switching a connection configuration (manner) according to a connection-target device.

Description of the Related Art

A technique is known in which a data processing apparatus such as a digital camera is equipped with a wireless communication function, and image data held by the data processing apparatus is transmitted to an external apparatus via an access point that forms a wireless LAN (Japanese Patent Laid-Open No. 2007-166577). Using this function allows for easier transmission of image data to an external apparatus.

Also in recent years, a technique has been known in which a data processing apparatus serving as an image transmission origin searches for a service-supporting device to which image transmission or the like is possible without connecting to a wireless LAN, and transmits image data to a detected external apparatus. Also, a technique is known in which a data processing apparatus switches a connection configuration (manner) with an external apparatus according to a function (image transmission, printing, and the like) that is to be executed after connecting to the external apparatus (Japanese Patent Laid-Open No. 2007-215070).

However, as described in the aforementioned Japanese Patent Laid-Open No. 2007-215070, there are cases where the connection configuration cannot be appropriately switched by only switching the connection configuration according to the function to be executed after connecting to the external apparatus. For example, it is not possible to perform control such that in the case where the connection-target device is a device that belongs to a user, a connection configuration (manner) for executing various functions of the user device is switched to, whereas in the case where the connection-target device belongs to another user, a connection configuration (manner) for only executing limited functions such as image transmission or the like is switched to.

SUMMARY OF THE INVENTION

The present invention has been made in consideration of the aforementioned problems, and realizes a technique in which a connection configuration (manner) can be appropriately switched according to a connection-target device.

In order to solve the aforementioned problems, the present invention provides a data processing apparatus comprising: a communication unit configured to communicate with an external apparatus, using any of a plurality of communication manners including a first connection manner via a network and a second connection manner that is different from the first connection manner; a search unit configured to search for an external apparatus capable of executing a predetermined function; a selection unit configured to select an external apparatus found in the search by the search unit as a connection-target device; and a control unit configured to control the communication unit such that, in a case where the external apparatus selected by the selection unit has been connected to previously and content data has been transmitted to the external apparatus previously, communication is performed with the external apparatus using the first connection manner, and to control the communication unit such that, in a case where content data has not been transmitted to the external apparatus previously, communication is performed with the external apparatus using the second connection manner.

In order to solve the aforementioned problems, the present invention provides a communication apparatus comprising: a communication unit configured to communicate with a data processing apparatus, using any of a plurality of communication manners including a first connection manner via a network and a second connection manner that is different from the first connection manner; a receiving unit configured to receive, from the data processing apparatus, an acquisition request for device information including information regarding a function that is executable by the communication apparatus; a transmission unit configured to transmit a response to the acquisition request; and a control unit configured to switch, based on a connection request from the data processing apparatus, between connecting to the data processing apparatus using the first connection manner via a network to which the data processing apparatus joins and connecting to the data processing apparatus using the second connection manner.

In order to solve the aforementioned problems, the present invention provides a method of controlling a data processing apparatus having a communication unit configured to communicate with an external apparatus, using any of a plurality of communication manners including a first connection manner via a network and a second connection manner that is different from the first connection manner, the method comprising: searching for an external apparatus that is capable of executing a predetermined function; selecting an external apparatus found in the search as a connection-target device; and controlling the communication unit such that, in a case where the selected external apparatus has been connected to previously and content data has been transmitted to the external apparatus previously, communication is performed with the external apparatus using the first connection manner, and controlling the communication unit such that, in a case where content data has not been transmitted to the external apparatus previously, communication is performed with the external apparatus using the second connection manner.

In order to solve the aforementioned problems, the present invention provides a method of controlling a communication apparatus having a communication unit configured to communicate with a data processing apparatus, using any of a plurality of communication manners including a first connection manner via a network and a second connection manner that is different from the first connection manner, the method comprising: receiving, from the data processing apparatus, an acquisition request for device information regarding a function that is executable by the communication apparatus; transmitting a response to the acquisition request; and switching, based on a connection request from the data processing apparatus, between connecting to the data processing apparatus using the first connection manner via a network to which the data processing network joins, and connecting to the data processing apparatus using the second connection manner.

In order to solve the aforementioned problems, the present invention provides a non-transitory computer-readable storage medium storing a program for causing a computer to execute a method of controlling a data processing apparatus having a communication unit configured to communicate with an external apparatus, using any of a plurality of communication manners including a first connection manner via a network and a second connection manner that is different from the first connection manner, the method comprising: searching for an external apparatus that is capable of executing a predetermined function; selecting an external apparatus found in the search as a connection-target device; and controlling the communication unit such that, in a case where the selected external apparatus has been connected to previously and content data has been transmitted to the external apparatus previously, communication is performed with the external apparatus using the first connection manner, and controlling the communication unit such that, in a case where content data has not been transmitted to the external apparatus previously, communication is performed with the external apparatus using the second connection manner.

In order to solve the aforementioned problems, the present invention provides a non-transitory computer-readable storage medium storing a program for causing a computer to execute a method of controlling a communication apparatus having a communication unit configured to communicate with a data processing apparatus, using any of a plurality of communication manners including a first connection manner via a network and a second connection manner that is different from the first connection manner, the method comprising: receiving, from the data processing apparatus, an acquisition request for device information regarding a function that is executable by the communication apparatus; transmitting a response to the acquisition request; and switching, based on a connection request from the data processing apparatus, between connecting to the data processing apparatus using the first connection manner via a network to which the data processing network joins, and connecting to the data processing apparatus using the second connection manner.

According to the present invention, a connection configuration (manner) can be appropriately switched to according to the connection-target device.

Further features of the present invention will become apparent from the following description of exemplary embodiments (with reference to the attached drawings).

BRIEF DESCRIPTION OF THE DRAWINGS

FIGS. 5A to 5F are diagrams showing application screens of the smartphone according to the embodiment.

FIG. 6 is a diagram showing a processing procedure for connection when switching the connection configuration between the digital camera and the smartphone according to the embodiment.

FIGS. 8A to 8B are flowcharts showing processing by the digital camera when switching a communication configuration between the digital camera and the smartphone according to the embodiment.

FIGS. 9A to 9B are flowcharts showing processing by the smartphone when switching the communication configuration between the digital camera and the smartphone according to the embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

The following will describe a system in which a smartphone, which is a kind of mobile phone, is connected in a communicable manner to a digital camera via a network, the smartphone and the digital camera being used as a data processing apparatus and a communication apparatus of the present invention.

Note that, in the present embodiment, while a digital camera is envisioned as being the data processing apparatus, the data processing apparatus may be another mobile phone equipped with a camera, a smartphone (including optical glasses-type terminals and wrist watch-type terminals), which is a type of mobile phone, a portable media player, a gaming device, a portable electronic device such as an electronic book reader, or an image processing apparatus such as a tablet terminal, a personal computer (PC) equipped with a camera, and the like. Also, in the present embodiment, while a smartphone (including optical glasses-type terminals and wrist watch-type terminals) which is a type of mobile phone is envisioned as being the communication apparatus, the communication apparatus may be a digital camera equipped with a wireless communication function, a printer, a portable media player, a gaming device, a portable electronic device such as an electronic book reader, or an information processing apparatus such as a tablet terminal, a PC, and the like.

Configuration of Digital Camera

The configuration and functions of a digital camera 100 of the present embodiment will be described with reference to FIG. 1.

Figure 1:
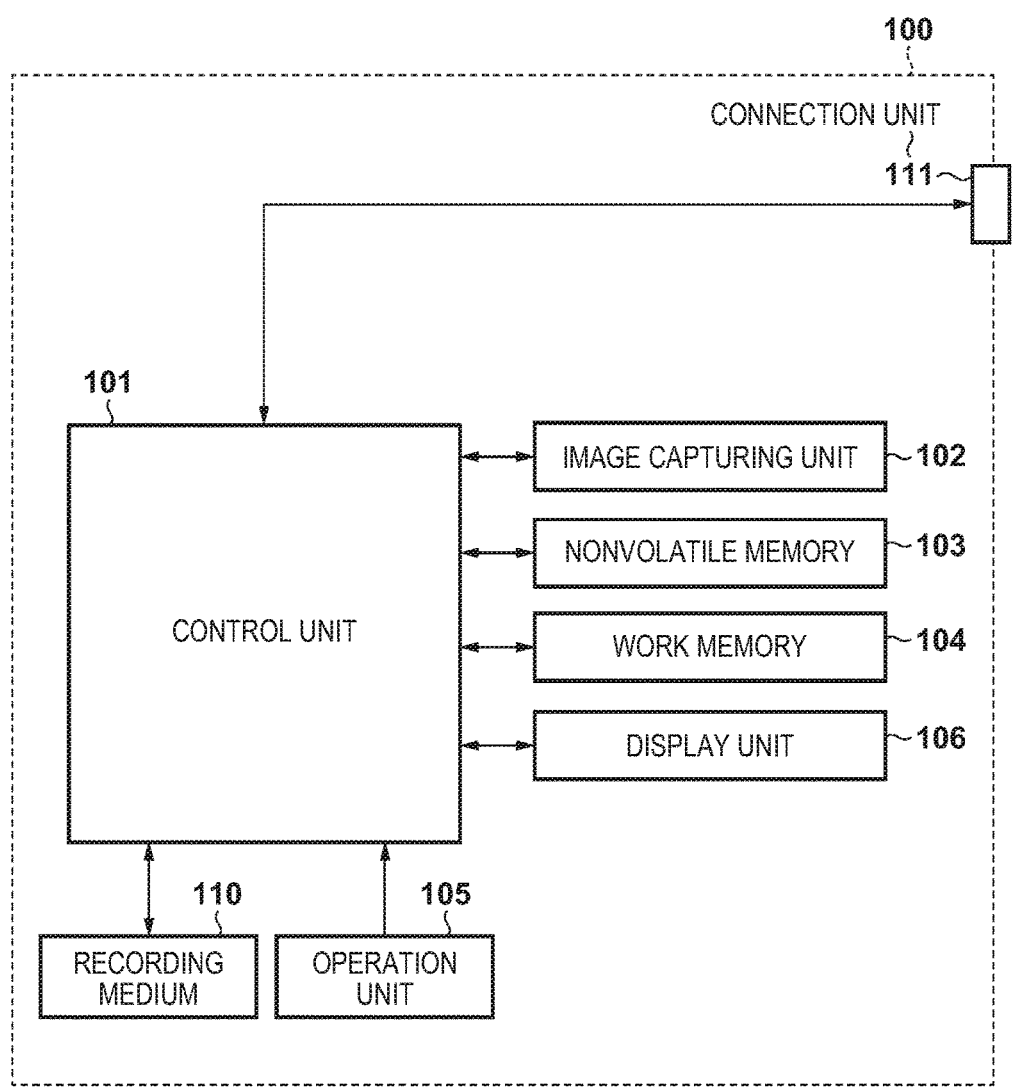
FIG. 1 is a block diagram showing a configuration of a digital camera according to an embodiment.

Referring to FIG. 1, a control unit 101 is an arithmetic processing unit (CPU) which comprehensively controls the overall digital camera 100, and implements various types of processes in flowcharts (to be described later) by executing programs stored in a nonvolatile memory 103 (to be described later). Note that a plurality of pieces of hardware may control the overall apparatus by sharing processes instead of making the control unit 101 control the overall apparatus.

An image capturing unit 102 includes a lens group including a zoom lens and a focus lens, and a shutter having a stop function. The image capturing unit 102 also includes an image sensor formed from a CCD, CMOS device, or the like which converts an object image into an electrical signal, an A/D converter which converts an analog image signal output from the image sensor into a digital signal, and a noise reduction circuit, etc. Image data captured by the image capturing unit 102 is stored in a buffer memory. After that, the control unit 101 performs predetermined image processing and calculation processing of the image data and records the image data in a recording medium 110.

The nonvolatile memory 103 is an electrically erasable/recordable memory, and, for example, an EEPROM is used. Constants, programs, and the like for the operation of the control unit 101 are recorded in the nonvolatile memory 103. In this case, the programs are those for executing various types of flowcharts to be described later in this embodiment.

A work memory 104 is used as a work area where constants and variables for the operation of the control unit 101, programs read out from the nonvolatile memory 103, and the like are loaded. The work memory 104 is also used as a buffer memory for temporarily holding the image data captured by the image capturing unit 102 or an image display memory for a display unit 106.

An operation unit 105 is constituted by operation members such as various types of switches and buttons, and a touch panel which receive various types of operations from the user, including, for example, a power switch, a shutter release switch, and a mode change-over switch. The mode change-over switch switches the operation mode of the control unit 101 to any of a still image recording mode, a moving image recording mode, and a reproduction mode. The shutter release switch is turned on to generate a first shutter switch signal SW1 when the shutter button provided on the digital camera 100 is operated halfway, that is, half-pressed (shooting preparation instruction). Upon receiving the first shutter switch signal SW1, the control unit 101 controls the image capturing unit 102 to start an operation such as AF (Automatic Focus) processing, AE (Automatic Exposure) processing, AWB (Automatic White Balance) processing, or EF (Electronic Flash) processing. In addition, the shutter release switch is turned on to generate a second shutter switch signal SW2 when the shutter button is operated completely, that is, full-pressed (shooting instruction). Upon receiving the second shutter switch signal SW2, the control unit 101 starts a series of shooting operations from reading out a signal from the image capturing unit 102 to writing image data in the recording medium 110.

The display unit 106 displays a view finder image at the time of shooting, a captured image, and characters for a dialogical operation. The display unit 106 is, for example, a display device such as a liquid crystal display or an organic EL display. The display unit 106 may be integrally formed with the digital camera 100 or may be an external apparatus connected to the digital camera 100.

The control unit 101 records an image file captured by the image capturing unit 102 and generated by the control unit 101 in the recording medium 110. The control unit 101 reads out an already recorded image file from the recording medium 110. The recording medium 110 may be a memory card, hard disk drive, or the like mounted in the digital camera 100, or a flash memory or hard disk drive built into the digital camera 100.

A connection unit 111 is an interface for connecting a smartphone 200 and an external apparatus that provides predetermined services such as image transmission, display, printing, and the like. The digital camera 100 according to the present embodiment can transfer and receive data to and from an external apparatus via the connection unit 111. Also, the connection unit 111 includes an infrastructure mode interface as a first connection configuration (manner) in which communication with an external apparatus is performed via a wireless LAN, and an ad hoc mode interface as a second connection configuration (manner) in which communication with an external apparatus is performed without using a wireless LAN. The control unit 101 controls the connection unit 111 according to the external apparatus, and as a result, switches to either the first connection configuration or the second connection configuration, which are described later, to perform wireless communication. Note that the communication scheme is not limited to wireless LAN, and, for example, a USB (Universal Serial Bus), Bluetooth (Registered Trademark), and the like can be used. It should be noted that NFC (Near Field Communication) and the like in which the communication distance is around 10 cm can also be used.

Note that the digital camera 100 according to the present embodiment can operate as a slave apparatus in a wireless LAN infrastructure mode. In a case where the digital camera 100 operates as a slave apparatus, the digital camera 100 can join a network formed by an access point (hereinafter "AP") by connecting to a peripheral AP. Also, while the digital camera 100 according to the present embodiment is a type of AP, it can also operate as a simple AP with more limited functions (hereinafter "simple AP"). Note that an AP according to the present embodiment is an example of a relay apparatus. If the digital camera 100 operates as a simple AP, the digital camera 100 forms its own network. Apparatuses that are peripheral to the digital camera 100 recognize the digital camera 100 as an AP and are able to join the network formed by the digital camera 100. It is assumed that programs for operating a digital camera 100 such as that described above are held in a nonvolatile memory 103.

Configuration of Smartphone

Figure 2:
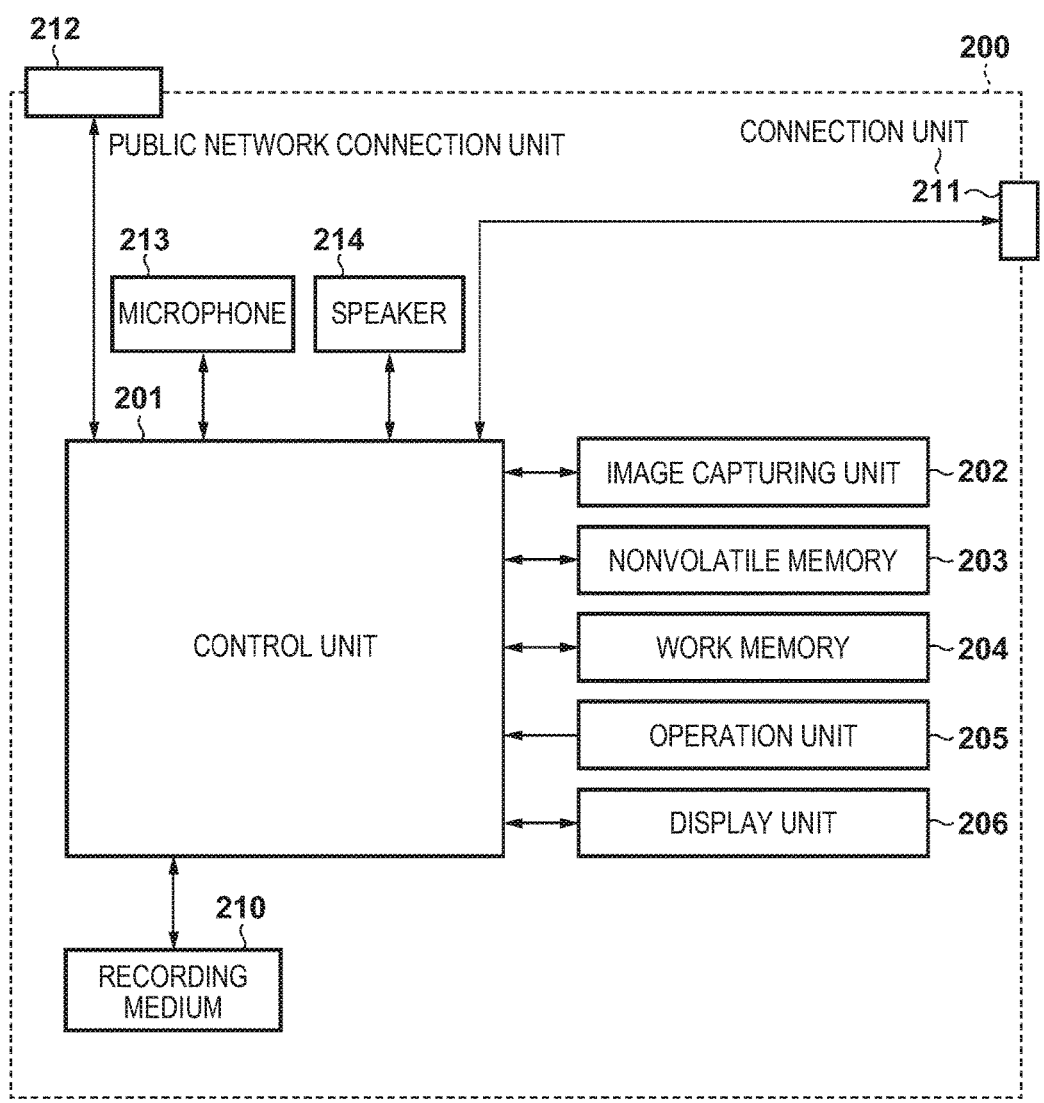
FIG. 2 is a block diagram showing a configuration of a smartphone according to the embodiment.

The configuration and functions of a smartphone 200 of the present embodiment will be described with reference to FIG. 2.

The smartphone 200 according to this embodiment includes a control unit 201, an image capturing unit 202, a nonvolatile memory 203, a work memory 204, an operation unit 205, a display unit 206, a recording medium 210, and a connection unit 211. The basic functions of the respective elements are the same as those of the digital camera 100, and hence a detailed description of them will be omitted. If the communication apparatus is a PC, it need not include any display unit as long as it includes a display control function which controls the display of the display unit.

Assume that a program for communication with the digital camera 100 is held in the nonvolatile memory 203 and installed as application software of a camera. Note that processing in the smartphone 200 according to this embodiment is implemented by reading programs provided by the camera application. Assume that the camera application has programs for using the basic function of the OS installed in the smartphone 200. Note that the OS of the smartphone 200 may have programs for implementing processing in this embodiment.

A public network connection unit 212 is an interface used for public wireless communication. The smartphone 200 can perform telephone calls and data communication with another communication apparatus via the public network connection unit 212. When performing a telephone call, the control unit 201 inputs and outputs voice signals via a microphone 213 and a speaker 214. Assume that in this embodiment, the public network connection unit 212 includes an interface for performing communication using 3G. Note that the public network connection unit 212 is not limited to 3G and it is possible to use another communication scheme such as LTE, WiMAX, ADSL, FTTH, or so-called 4G. In addition, the connection unit 211 and the public network connection unit 212 need not necessarily be implemented by independent pieces of hardware. For example, one antenna can have both the functions.

Connection Configuration of Digital Camera and Smartphone

Next, a connection configuration (manner) and a procedure for connection processing of the digital camera 100 and the smartphone 200 according to the present embodiment will be described with reference to FIGS. 3A and 3B and FIGS. 4A and 4B.

Figure 3A:
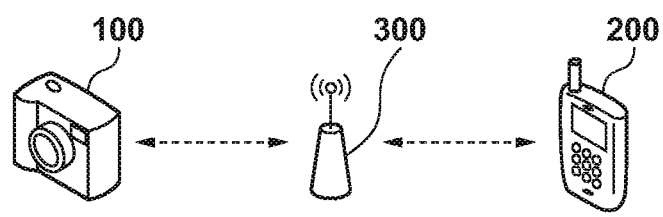
FIGS. 3A and 3B are diagrams illustrating a connection configuration between the digital camera and the smartphone according to the embodiment.
Figure 3B:

In the case where data is to be transmitted between the digital camera 100 and the smartphone 200 of the present embodiment through wireless communication, the first connection configuration shown in FIG. 3A and the second connection configuration shown in FIG. 3B can be used.

FIG. 3A shows a connection configuration (manner) in which the digital camera 100 and the smartphone 200 join a wireless LAN formed by an AP 300 which is an example of an external apparatus. The digital camera 100 and the smartphone 200 detect a beacon signal that is regularly transmitted by the AP 300, and join the wireless LAN formed by the AP 300. After the digital camera 100 and the smartphone 200 have joined the same wireless LAN, communication is established and data can be transmitted and received via the wireless LAN through the devices finding each other and performing processing for acquiring capability information and the like. In the first connection configuration, the digital camera 100 and the smartphone 200 join the same AP 300, but the present invention is not limited thereto. For example, a mode in which the digital camera 100 and the smartphone 200 are directly connected to each other rather than via the AP 300 may be employed. In this case, the digital camera 100 operates as a simple AP and forms a wireless LAN. In the case where the digital camera 100 operates as a simple AP, the digital camera 100 starts regularly transmitting a beacon signal. The smartphone 200 detects the beacon signal and joins the wireless LAN formed by the digital camera 100. Thus, similar to the first connection configuration described above, communication is established and data can be transmitted and received through the devices finding each other and performing processing for acquiring capability information and the like.

FIG. 3B shows a connection configuration (manner) in which the digital camera 100 and the smartphone 200 directly communicate in an ad-hoc mode or Wi-Fi Direct and not via the AP 300. Wi-Fi Direct is a specification drawn up by the Wi-Fi Alliance, which is a wireless LAN promotion organization. According to this specification, even if the AP 300 is not present, devices such as a smartphone that is equipped with a function for forming a wireless LAN, a tablet terminal, a PC, a digital camera, a printer, a portable gaming device, and the like can connect and wirelessly communicate with each other.

In the present embodiment, comparing the device information acquired from a connection-target device and past connection history and browsing history of the device, allows for execution of a function that corresponds to the connection-target device by switching to either the first connection configuration or the second connection configuration.

Hereinafter, the procedure for the connection processing of the first connection configuration and the second connection configuration will be described with reference to FIGS. 4A and 4B and FIGS. 5A to 5F, and then, switching control of the connection configurations according to the present embodiment will be described with reference to FIG. 6.

Connection Processing Procedure

First, the procedure for connection processing of the digital camera 100 and the smartphone 200 of the first connection configuration shown in FIG. 3A and the second connection configuration shown in FIG. 3B will be described with reference to FIG. 4A and FIG. 4B.

Figure 4A:
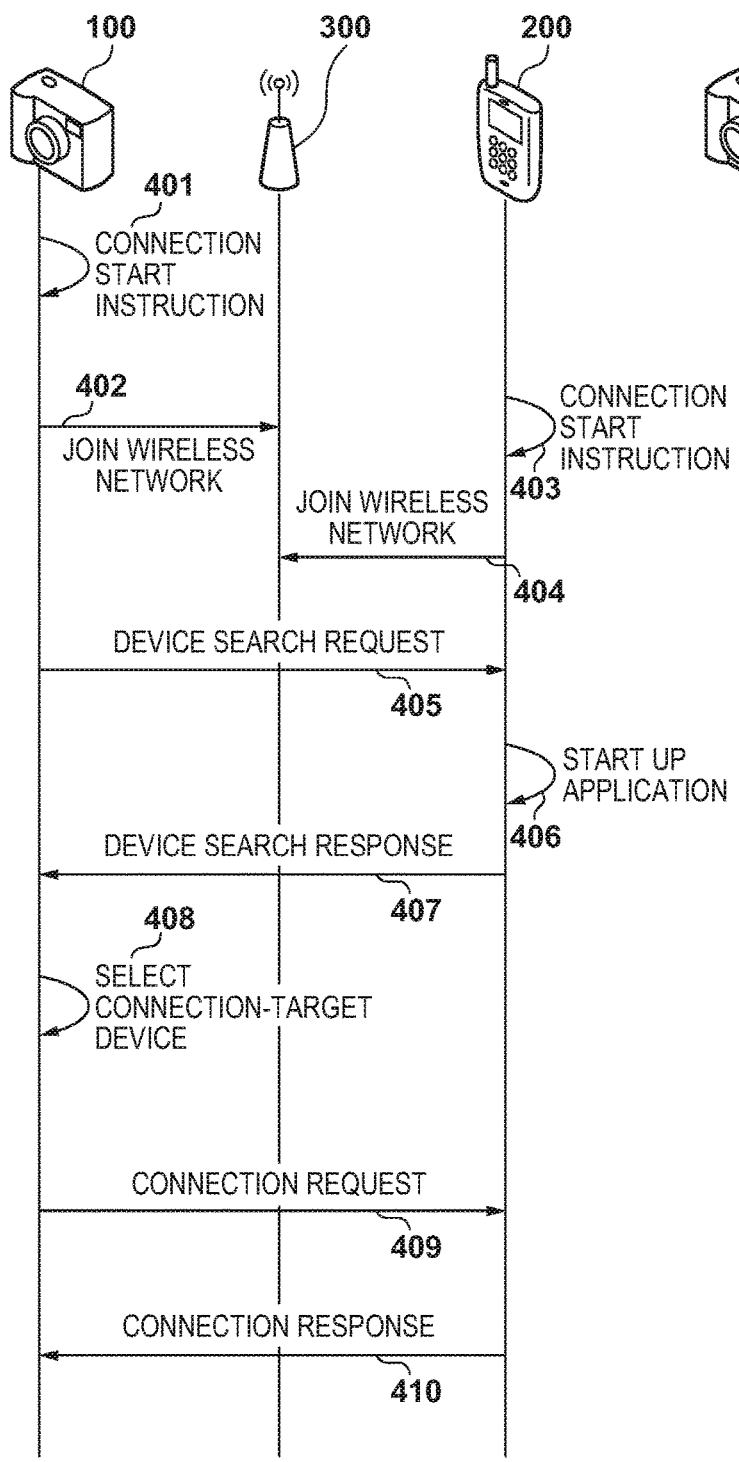
FIGS. 4A and 4B are diagrams showing a processing procedure for connection between the digital camera and the smartphone according to the embodiment.

FIG. 4A shows the processing procedure for connection in the first connection configuration shown in FIG. 3A.

First, when the digital camera 100 is instructed to start connection (401), the digital camera 100 joins the wireless network formed by the AP 300 (402). Similarly, when the smartphone 200 is instructed to start connection (403), the smartphone 200 joins the wireless network formed by the AP 300 (404). In order for the digital camera 100 to find the smartphone 200, the digital camera 100 makes a device search request to the wireless LAN (405). In order for the smartphone 200 to respond to the device search request, the smartphone 200 starts up a camera application (406) and responds to the device search made by the digital camera 100 (407). Accordingly, the devices can find each other. The digital camera 100 selects a connection-target device from among the found devices (408). Capability information and the like are acquired by using a request and a response (409, 410) between the digital camera 100 and the smartphone 200, and a connection is established, enabling data to be transmitted and received.

Figure 4B:
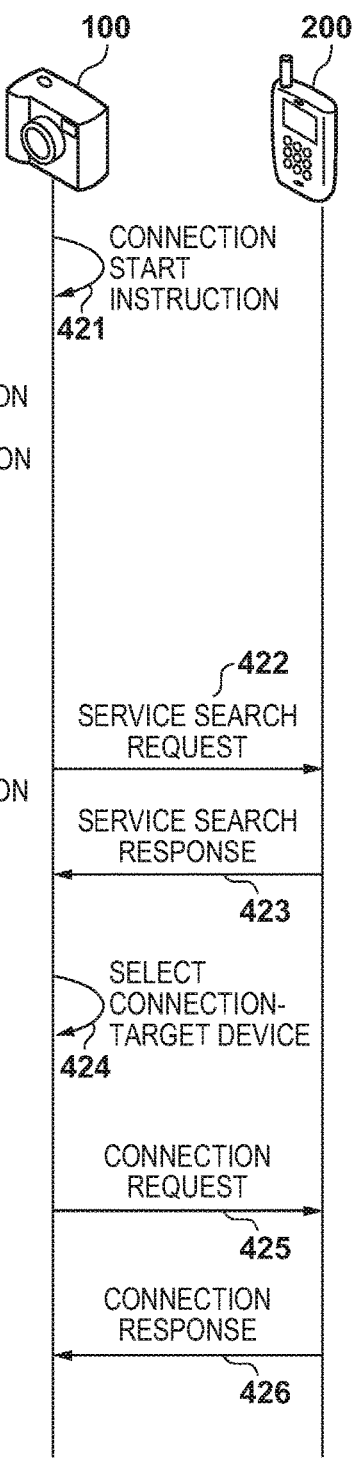

FIG. 4B shows the processing procedure for connection in the second connection configuration shown in FIG. 3B.

First, when the digital camera 100 is instructed to start connection (421), the digital camera 100 starts searching for devices that provide an image transmission service, among the surrounding devices (422). Here, devices that provide an image transmission service are deemed as being a search target device, but the present invention is not limited thereto, and the devices may be devices such as those that provide an image printing service, an image display service, and the like. That is, a device that supports a function (hereinafter, "service") that is to be executed by the connection-target device, may be a search target device. In the present embodiment, an image transmission service in which image data held by the digital camera 100 is transmitted to the smartphone 200 will be described as an example. The smartphone 200 responds to a service search request made by the digital camera 100 (422), in the case where the requested service is one that can be executed by the smartphone 200 (423). Accordingly, the digital camera 100 can find a device that supports the service searched for by the digital camera 100. The digital camera 100 selects a connection-target device from among the found service-supporting devices (424). Acquisition of capability information and the like is performed via a connection request and response (425, 426) between the digital camera 100 and the smartphone 200, of which one forms a wireless network and the other joins the formed wireless network. Then, a connection is established between the devices, enabling data to be transmitted and received. The method of forming the wireless network in 425 and 426 can be a method that complies with the ad-hoc mode of a wireless LAN or Wi-Fi Direct, for example.

Application Screen

Next, a camera application screen displayed on the display unit 206 of the smartphone 200 in the case where a connection has been established between the digital camera 100 and the smartphone 200 and a desired function is to be executed on the service-supporting device, will be described with reference to FIGS. 5A to 5F.

FIG. 5A shows a standby screen 500 of the smartphone 200. Starting up of the camera application, issuing an instruction to join a wireless network, and the like can be performed by the user touching an icon button 501 on the standby screen 500 using the operation unit 205.

FIGS. 5B to 5E show transitions between camera application screens in the first connection configuration described using FIG. 3A and FIG. 4A.

FIG. 5B shows a menu screen 510 that is displayed due to the icon button 501 being selected (the camera application being started up). A settings button 511 is a button for performing various settings such as setting the device name of the smartphone 200. A function selection button 512 is a button for displaying image data saved by the digital camera 100 that has established communication, on the display unit 206. A function selection button 513 is a button for shooting an image using the digital camera 100 that has established communication.

FIG. 5C shows an image list screen 520 that is displayed due to the function selection button 512 on the menu screen 510 being selected. In the image list screen 520 shown in FIG. 5C, thumbnails 521 of the image data held by the digital camera 100 are displayed vertically and horizontally in list form, and other image data can be displayed by performing a scroll operation in an up-down direction.

FIG. 5D shows an enlarged screen 530 in which a thumbnail 521 selected on the image list screen 520 in FIG. 5C is displayed at a larger size, compared with the screen in FIG. 5C. Note that, in the present embodiment, the selected thumbnail is displayed as is at a larger size, but considering display at a large size, the digital camera 100 may be requested again to display even larger thumbnails or the original image data. Also, a save button 531 and a delete button 532 are included in the enlarged screen 530 shown in FIG. 5D. The save button 531 is a function selection button for receiving original image data corresponding to a displayed thumbnail from the digital camera 100 and recording the received image data in the recording medium 210 of the smartphone 200. The delete button 532 is a function selection button for deleting original image data that corresponds to a displayed thumbnail from the digital camera 100.

FIG. 5E shows a live view screen 540 that is displayed due to the function selection button 513 being selected in the menu screen 510 shown in FIG. 5B. The smartphone 200 receives image data captured by the digital camera 100 and performs live view display on an image display unit 541. A shoot button 542 is a function selection button for instructing the digital camera 100 to shoot an image. Upon receiving an instruction from the smartphone 200 to shoot an image, the digital camera 100 performs predetermined processing for shooting, and the generated image data is recorded in the recording medium 110.

FIG. 5F shows a menu screen 550 in the second connection configuration described using FIG. 3B and FIG. 4B. After transmitting and receiving of data has become possible with the second connection configuration, when the smartphone 200 receives image data from the digital camera 100, display is performed on a notification unit 551 to give notice that image data has been received. Note that, in the present embodiment, notice is given each time image data is received, but the present invention is not limited thereto. For example, display may be performed such that notice of received image data is collectively given when the connection is terminated, and at the time when notice is given, the image data may be displayed as thumbnails so that the type of received image data can be easily comprehended.

Connection Configuration Switch Control

Next, a processing procedure for connection related to the first connection configuration and the second connection configuration, and screen transition of the digital camera 100 will be described with reference to FIGS. 6 and 7.

Figure 7A:
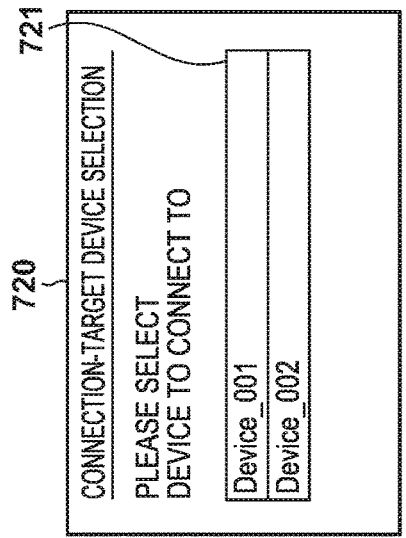
FIGS. 7A to 7E are diagrams showing the transition of screens on the digital camera regarding connection configuration switch control according to the embodiment.

First, the digital camera 100 displays an image reproduction screen 700 shown in FIG. 7A on the display unit 106. A connection start instructing unit 701 is included in the image playback screen 700 shown in FIG. 7A. The connection start instructing unit 701 is a function selection button for instructing the digital camera 100 to start a connection. When the connection start instructing unit 701 is selected by the user operating the operation unit 105, the digital camera 100 starts the processing for connection.

Figure 7B:
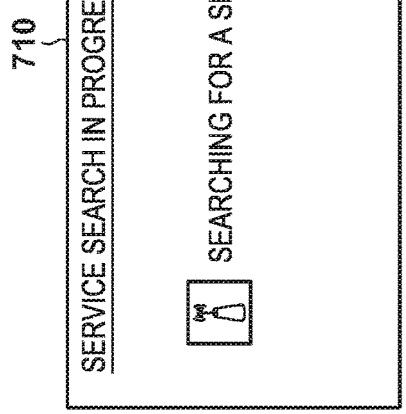

When the digital camera 100 is instructed to start connection (601), the digital camera 100 displays a service search screen 710 shown in FIG. 7B on the display unit 106, and starts searching for a service-supporting device (602).

A smartphone 200 responds (603) to the service search by the digital camera 100 (602) in the case where a service that is searched for is a service that can be executed by the smartphone 200. Accordingly, the digital camera 100 can find a service-supporting device. The digital camera 100 makes an acquisition request for device information to the found service-supporting device (604), and the smartphone 200 transmits the device information to the digital camera 100 (605).

Figure 7C:
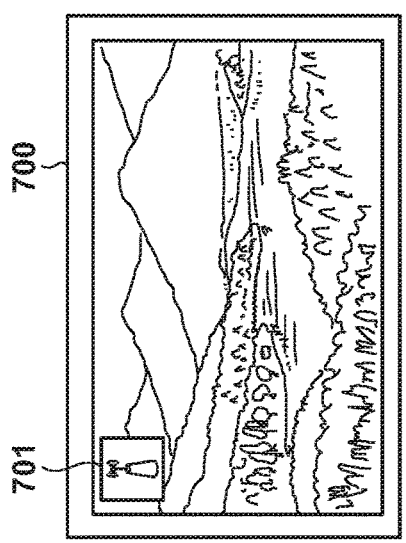

When the digital camera 100 acquires the device information from the found service-supporting devices, a list screen 720 of service-supporting devices shown in FIG. 7C is displayed on the display 106 in order to allow the user to select a connection-target device. A device selection unit 721 is included in the device list screen 720 shown in FIG. 7C. When the user operates the operation unit 105 to select the connection-target device from the device selection unit 721 (606), the digital camera 100 determines the connection configuration (607). In the present embodiment, the connection configuration is decided according to whether or not there is history indicating that the digital camera 100 has, in the past, transmitted image data held thereby to the connection-target device.

Figure 7D:
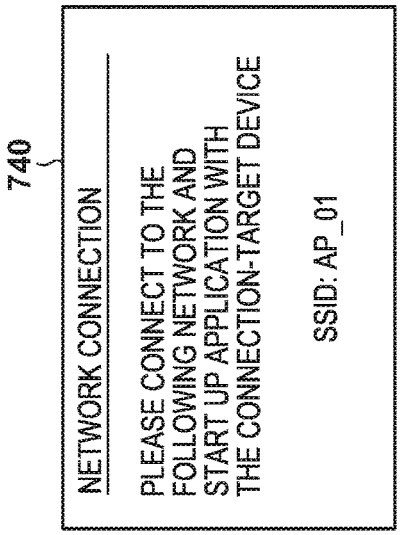

In a case where history information indicating that image data has been transmitted in the past regarding the connection-target device does not exist in the nonvolatile memory 103, the digital camera 100 displays a connected screen 730 shown in FIG. 7D on the display unit 106, and transmits image data.

Figure 7E:
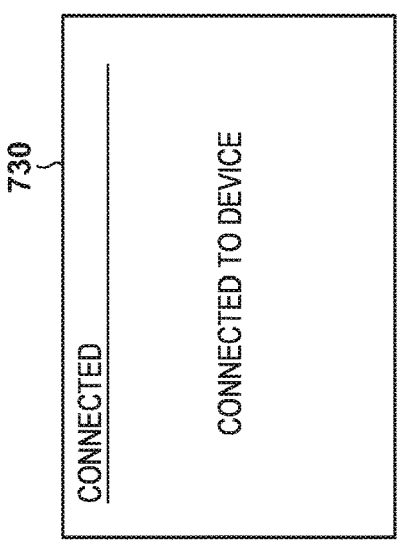

On the other hand, in the case where history information does exist, the digital camera 100 stops the service search (608), and displays a network connection screen 740 shown in FIG. 7E on the display unit 106. Then, the digital camera 100 joins a wireless LAN formed by the AP 300, which is the first connection configuration (609). After the digital camera 100 has joined the wireless LAN, display is performed on the network connection screen 740 shown in FIG. 7E, to prompt the starting up of a camera application and connecting of the smartphone 200 serving as the connection-target device to the wireless LAN. Here, when the smartphone 200 is instructed to start connection as described with FIG. 4A, the smartphone 200 joins the wireless LAN formed by the AP 300 (610).

In order to find the smartphone 200 acting as the connection-target device, the digital camera 100 makes a device search request to the wireless LAN (611). In order for the smartphone 200 to respond to the device search request, the smartphone 200 starts up the camera application (612) and responds to the device search made by the digital camera 100 (613). Accordingly, the devices can find each other in a wireless LAN. Next, capability information and the like is acquired by using a request and a response (614, 615)

between the digital camera 100 and the smartphone 200, and a connection is established, enabling data to be transmitted and received.

Digital Camera Processing

Next, the processing for the digital camera 100 that is performed when the communication manner between the digital camera 100 and the smartphone 200 is switched will be described with reference to FIGS. 7A to 7F and FIGS. 8A to 8B.

Figure 8B:
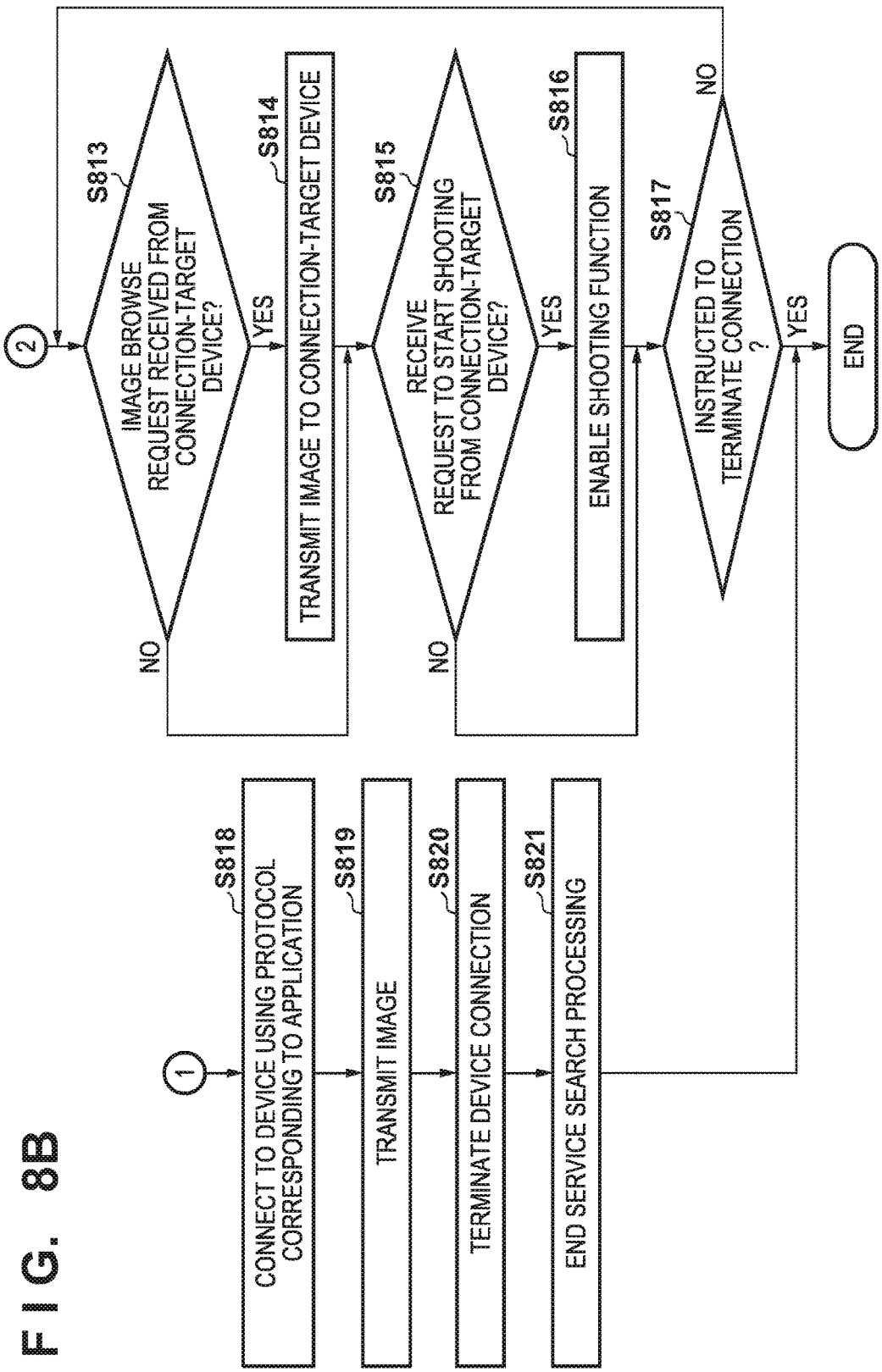

The processing shown in FIGS. 8A to 8B is started when the connection start instructing unit 701 is selected on the image playback screen 700, and is realized by the control unit 101 reading out and executing a program stored in the nonvolatile memory 103 to the work memory 104.

In step S801, the control unit 101 displays the image playback screen 700 shown in FIG. 7A on the display unit 106, and determines whether or not the connection start instruction unit 701 was selected, and in the case where it was selected, the procedure proceeds to step S802.

In step S802, the control unit 101 displays the service search screen 710 shown in FIG. 7B on the display unit 106, and starts searching for a service-supporting device.

In step S803, the control unit 101 determines whether or not a service-supporting device has been detected, via the connection unit 111, and in the case where a service-supporting device has been detected, the procedure proceeds to step S804, otherwise the procedure proceeds to step S808.

In step S804, the control unit 101 acquires device information regarding a detected device via the connection unit 111, and stores the information in the nonvolatile memory 103. In the present embodiment, the name and the MAC address of the detected devices are acquired as the device information. The MAC address of the smartphone 200 is used to uniquely specify the smartphone 200, and the name of a device can be used for displaying the name of a detected device on the device list screen 720 shown in FIG. 7C, but the present invention is not limited thereto. For example, a phone number of the smartphone 200 may be used as the information for uniquely specifying the smartphone 200, and information input by the user may be used as the name of a detected device. It is sufficient that at least information for specifying the smartphone 200 is included as the device information.

In step S805, the control unit 101 displays the device list screen 720 shown in FIG. 7C on the display unit 106. Here, the names of the devices acquired in step S804 are displayed on the device selection unit 721. In the case where there are a plurality of detected devices, a list including a plurality of device names is displayed on the device selection unit 721 as shown in FIG. 7C, and the user can select any of the plurality of devices. Note that when the device selection unit 721 displays a list, the display order may be switched using the device information acquired in step S804. For example, in the case where the MAC address of a detected device matches a MAC address of a device that has been connected to in the past, display may be performed such that the number of such a device is displayed higher up in the order displayed on the device selection unit 721. Also, even in the case where a list is not displayed, if the MAC address of the detected device matches a MAC address of a device that has been connected to in the past, the device that has been connected to in the past may be identifiably displayed as being such a device by changing the display color of the name of the detected device, and the like.

In step S808, the control unit 101 determines whether or not one or more devices have been detected, via the connection unit 111, and in the case where one or more devices have been detected, the procedure proceeds to step S806, otherwise the procedure returns to step S803.

In step S806, the control unit 101 determines whether or not a connection-target device has been selected as a result of the operation unit 105 being operated, and if a device has been selected, the procedure proceeds to step S807, otherwise the procedure returns to step S803. Accordingly, until a device is detected, the device list screen 720 shown in FIG. 7C is not displayed, and even after a device is detected, device detection is continued. In the present embodiment, a connection-target device is selected by operating the operation unit 105, but the present invention is not limited thereto. For example, in the case where the MAC address of a detected device matches a MAC address of a device that has been connected to in the past, control may be performed such that this device is automatically selected.

In step S807, the control unit 101 determines whether image data recorded in the recording medium 110 has been transmitted to the connection-target device, that is, whether or not the user of the connection-target device has been allowed to browse images. In the case where image data has been transmitted, the procedure proceeds to step S809, otherwise the procedure proceeds to step S818. This determination is performed based on the MAC address of the selected connection-target device, the device MAC address stored in the nonvolatile memory 103, and history information indicating whether image data has been previously transmitted to the selected connection-target device. The processing for storing the history information indicating whether image data has been previously transmitted to the connection-target device, to the nonvolatile memory 103 will be described below.

In step S809, the control unit 101 ends the processing for searching for a service. Accordingly, after a connection-target device has been selected, detection of a new service-supporting device is not performed.

In step S810, the control unit 101 displays the connected screen 730 shown in FIG. 7D on the display unit 106, and controls the connection unit 111 to join the wireless LAN formed by the AP 300.

In step S811, the control unit 101 displays the network connection screen 740 shown in FIG. 7E on the display unit 106. Here, the SSID of the AP 300 is displayed on the network connection screen 740 shown in FIG. 7E. Accordingly, the SSID of the wireless LAN that the smartphone 200 is to join can be clearly displayed. Also, start up of the camera application with the smartphone 200 is prompted in the network connection screen 740 in FIG. 7E.

In step S812, in order for the control unit 101 to find the smartphone 200, the control unit 101 makes a device search request to the wireless LAN via the connection unit 111. Also, when the control unit 101 detects a search response from a smartphone 200 via the connection unit 111, the control unit 101 establishes communication with the smartphone 200 via the connection unit 111, using the first connection configuration.

In step S813, the control unit 101 determines whether or not the digital camera 100 has received a request to browse images held therein from the smartphone 200 via the connection unit 111, and in the case where a request has been received, the procedure proceeds to step S814, otherwise the procedure proceeds to step S815.

In step S814, the control unit 101 records the MAC address and image browsing history information of the connection-target device to the nonvolatile memory 103. Also, the control unit 101 transmits the image data recorded in the recording medium 110 to the smartphone 200 via the connection unit 111. Here, in the present embodiment, when an image browse request has been received, images are transmitted to the connection-target device, but a configuration may be employed in which whether or not browsing is to be permitted can be selected by the user. Accordingly, in the case where browsing of image data held by the digital camera 100 is not to be permitted to a user of the connection-target device, control can be performed such that images are not transmitted.

In step S815, the control unit 101 determines whether a request to start shooting has been received from the smartphone 200 via the connection unit 111, and in the case where a request has been received, the procedure proceeds to step S816, otherwise the procedure proceeds to step S817.

In step S816, the control unit 101 enables the shooting function. Here, when a request to start image shooting has been received from the smartphone 200, the control unit 101 controls the image capturing unit 102 to perform predetermined image shooting processing, and records image data to the recording medium 110. Also, when a request for a view finder image has been received from the smartphone 200, the control unit 101 transmits the image data captured by the image capturing unit 102 to the smartphone 200 via the connection unit 111.

In step S817, in the case where an instruction to terminate the connection has been received, the control unit 101 ends the processing, otherwise the procedure returns to step S813.

In step S818, the control unit 101 connects to the smartphone 200 in ad-hoc mode or by Wi-Fi Direct, via the connection unit 111 (establishes connection using the second connection configuration).

In step S819, the control unit 101 transmits the image data displayed on the image playback screen 700 shown in FIG. 7A to the smartphone 200 via the connection unit 111. In the present embodiment, the image data that is transmitted is the image data being displayed on the image playback screen 700 in FIG. 7A is, but the present invention is not limited thereto, and, for example, the image data that is transmitted may be selected by a user, or may be an image with the most recent shooting time-date.

In step S820, the control unit 101 performs processing for terminating the connection with the smartphone 200, via the connection unit 111. In the present embodiment, the connection to the smartphone 200 is terminated by the digital camera 100, but the present invention is not limited thereto, and the connection may be terminated at a point in time at which the smartphone 200 has completed receiving an image.

In step S821, the control unit 101 ends the service search processing, and ends this processing.

Smartphone Processing

The processing by the smartphone 200 performed when the communication configuration between the digital camera 100 and the smartphone 200 is switched will be described with reference to FIGS. 5A to 5F and FIGS. 9A to 9B.

Figure 9B:
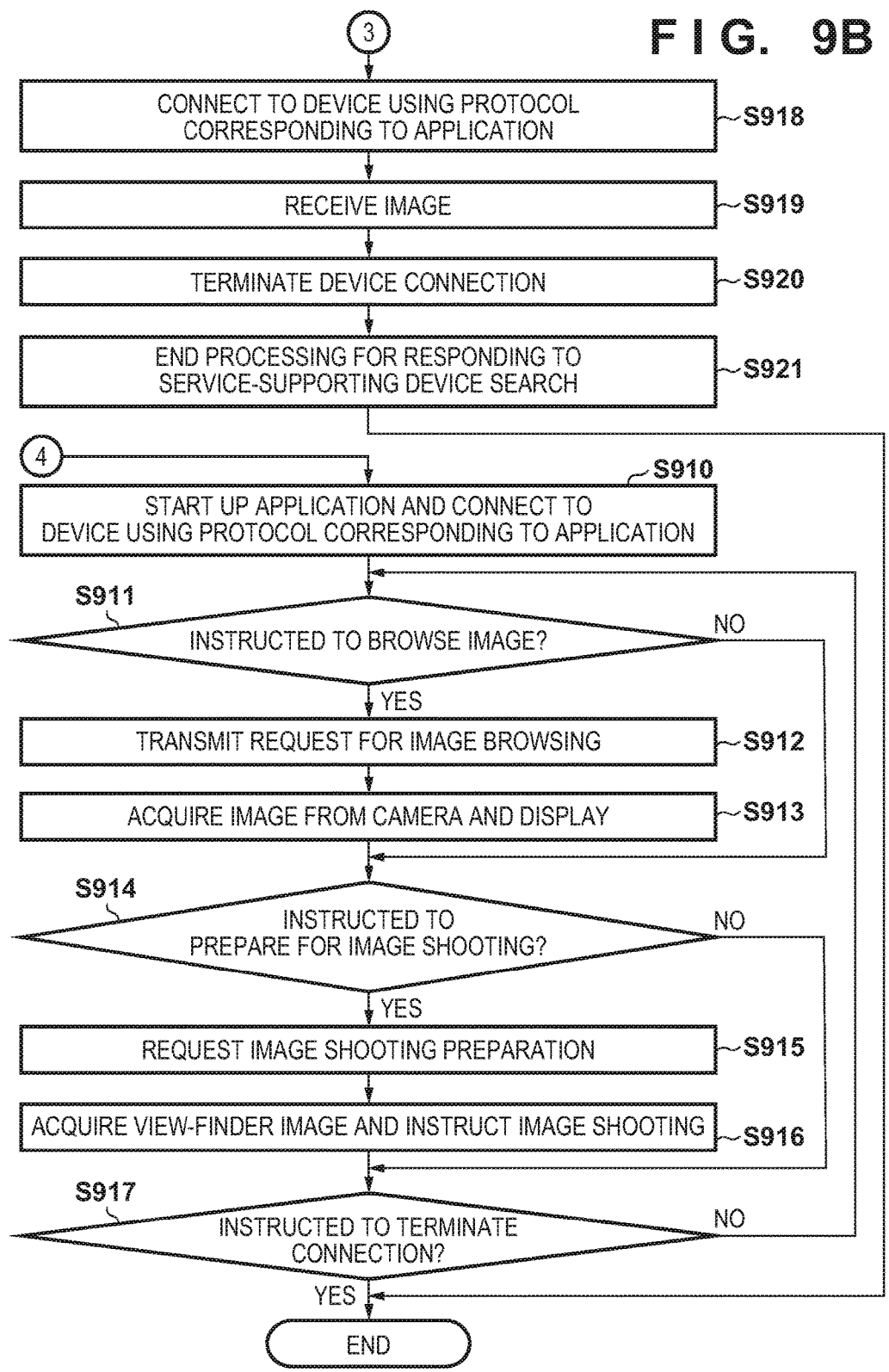

The processing shown in FIGS. 9A to 9B is realized by the control unit 201 reading out and executing a program stored in the nonvolatile memory 203 to the work memory 204, while the smartphone 200 is in standby.

In step S901, the control unit 201 displays the standby screen 500 shown in FIG. 5A on the display unit 206, and when an instruction is issued to start a response to the search for a service-supporting device, the procedure proceeds to step S902. In the present embodiment, it is assumed that an instruction to start search response processing can be performed by changing settings in advance in the menu screen 510 in FIG. 5B.

In step S902, the control unit 201 starts processing for responding to the search for a service-supporting device, via the connection unit 211.

In step S903, the control unit 201 determines whether or not a search request for a service-supporting device has been received via the connection unit 211, and in the case where a request has been received, the procedure proceeds to step S904.

In step S904, the control unit 201 transmits information for responding that the smartphone 200 is a service-supporting device, via the connection unit 211.

In step S905, the control unit 201 determines whether or not a request to acquire device information has been received via the connection unit 211, and in the case where a request has been received, the procedure proceeds to step S906.

In step S906, the control unit 201 transmits device information regarding the smartphone 200 via the connection unit 211. In the present embodiment, the MAC address of the connection unit 211 and the name of the smartphone are transmitted as the device information. Here, a unique product name that has been set in advance or a name set by the user may be the name of the smartphone.

In step S907, the control unit 201 determines whether or not a request for connection in ad-hoc mode or by Wi-Fi Direct has been received via the connection unit 211, in the case where a request has been received, the procedure proceeds to step S918, otherwise the procedure proceeds to step S908.

In step S908, the control unit 201 determines whether or not the icon button 501 has been selected and the camera application has been instructed to start up, and if the icon button 501 has been selected, the procedure proceeds to step S909, otherwise the procedure returns to step S907.

In step S909, the control unit 201 ends the processing for responding to the search for a service-supporting device performed via the connection unit 211, and joins the wireless LAN formed by the AP 300.

In step S910, the control unit 201 starts up the camera application and displays the menu screen 510, shown in FIG. 5B, on the display unit 206. Here, the control unit 201 responds to the device search when a device search request is received from a connection-target device, via the connection unit 211. Accordingly, devices can find each other in the wireless LAN formed by the AP 300. Next, the control unit 201 establishes a connection with the digital camera 100 using the first connection configuration via the connection unit 211.

In step S911, the control unit 201 determines whether or not the function selection button 512 has been selected in the menu screen 510 shown in FIG. 5B, and in the case where it has been selected, the procedure proceeds to step S912, otherwise the procedure proceeds to step S914. The function selection button 512 is a button for making a request to browse image data held by the digital camera 100.

In step S912, the control unit 201 transmits a request, to the digital camera 100, to browse the image data held by the digital camera 100, via the connection unit 211.

In step S913, the control unit 201 acquires image data held by the digital camera 100 from the digital camera 100 via the connection unit 211, and displays the image list screen 520 shown in FIG. 5C on the display unit 206. In the image list screen 520 in FIG. 5C, the thumbnails 521 of the image data held by the digital camera 100 are displayed vertically and horizontally in list form, and the user can further browse other pieces of image data by performing a scroll operation in the up-down direction. In the present embodiment, image data is acquired each time a scroll operation is performed in the up-down direction, but the present invention is not limited thereto, and, for example, thumbnails for all of the images may be acquired in advance. Also, the method of displaying the thumbnails 521 is not limited to that described above, for example, the thumbnails 521 and metadata of the images may be displayed.

In step S914, the control unit 201 determines whether or not the function selection button 513 has been selected on the menu screen 510 shown in FIG. 5B, and in the case where it has been selected, the procedure proceeds to step S915, otherwise the procedure proceeds to step S917. The function selection button 513 is a button for making a request for image shooting preparation that enables the shooting function of the digital camera 100.

In step S915, the control unit 201 transmits a request for shooting preparation that enables the shooting function to the digital camera 100 via the connection unit 211. In the present embodiment, the image shooting function of the digital camera 100 is enabled by making a request for shooting preparation that enables the shoot function, but the present invention is not limited thereto. For example, in the case of a digital camera 100 in which the image shoot function is always enabled, such a request to enable the shoot function is not necessary.

In step S916, the control unit 201 displays the live-view screen 540 shown in FIG. 5E on the display unit 206. The control unit 201, via the connection unit 211, makes a request to acquire a view finder image to be displayed on the image display unit 541, and displays the acquired view finder image on the image display unit 541. Also, when an image shoot button 542 is touched, the control unit 201 makes a request to the digital camera 100 for shoot processing, via the connection unit 211. In the present embodiment, only display of the live-view image 540 and an image shoot instruction have been described, but the present invention is not limited thereto, and, for example, changing the image shoot settings, a zoom instruction, and the like may be included.

In step S917, in the case where the control unit 201 receives an instruction to terminate the connection, the control unit 201 ends the processing, otherwise the procedure returns to step S911.

In step S918, the control unit 201 connects to the digital camera 100 in ad-hoc mode or by Wi-Fi Direct, via the connection unit 211 (communication using the second connection configuration is established).

In step S919, the control unit 201 receives image data from the digital camera 100 via the connection unit 211 and records the image data in the recording medium 210. Here, the control unit 201 displays the menu screen 550 shown in FIG. 5F on the display unit 206, and display is performed on the notification unit 551 to give notice of image data having been received.

In step S920, when the control unit 201 receives a request to terminate the connection from the digital camera 100 via the connection unit 211, the control unit 201 performs processing for terminating the connection. In the present embodiment, the connection to the smartphone 200 is terminated by the digital camera 100, but the present invention is not limited thereto, and the connection may be terminated by the smartphone 200 at the point in time at which the smartphone 200 has completed receiving an image.

In step S921, the control unit 201 ends the service search processing, and ends this processing.

In the present embodiment, control was described in which the first connection configuration and the second connection configuration are automatically switched according to the connection-target device, but a connection using a connection configuration (manner) designated by the user is also possible. In this case, as a result of the digital camera 100 recording the MAC address and the image data browsing history information of the connection-target device in advance, a connection configuration (manner) designated by the user can be applied to the present invention.

In the present embodiment described above, while the connection configuration is switched according to whether or not the image data held by the digital camera 100 has been transmitted to the smartphone 200, the present invention is not limited thereto. For example, the connection configuration at the time of the previous connection may be recorded and a determination may be made according to this connection configuration, or the connection configuration may be determined by allowing the user to make a selection. In the case of selection by the user, a selection list for selecting a connection configuration (manner) may be displayed on the digital camera 100 for selection by the user, or a button prompting connection to a smartphone in possession of the user may be displayed, and if the button is selected, the first connection configuration may be established.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-184313, filed Sep. 17, 2015 which is hereby incorporated by reference herein in its entirety.

What is claimed is:

1. A data processing apparatus comprising:
   a processor; and
   a memory storing programs that, when executed by the processor, causes the processor to function as:
   a communication unit configured to communicate with an external apparatus, using any of a plurality of communication manners including a first connection manner via a network and a second connection manner that is different from the first connection manner;
   a search unit configured to search for an external apparatus capable of executing a predetermined function for transmitting an image;
   a selection unit configured to select an external apparatus found in the search by the search unit as a connection-target device; and
   a control unit configured to determine if the selected external apparatus has been connected to previously such that, in a case where it is determined that the external apparatus selected by the selection unit has been connected to previously and image data has been transmitted to the external apparatus previously, the communication unit is controlled to communicate with the external apparatus using the first connection manner, and
   in a case where it is determined that image data has not been transmitted to the external apparatus previously, the communication unit is controlled to communicate with the external apparatus using the second connection manner,
   wherein in the first connection manner the control unit controls the external apparatus to start up an application, and to perform communication via a wireless network formed by an access point and to make a plurality of functions including the predetermined function executable using the application, and in the second connection manner the control unit controls the external apparatus to perform communication by a direct connection without starting up the application, and to make the predetermined function executable.

2. The apparatus according to claim 1, further comprising a display unit configured to, in a case where a plurality of external apparatuses are found in the search by the search unit, perform display such that any of the external apparatuses is selectable.

3. The apparatus according to claim 2, wherein the display unit identifiably displays an external apparatus that has previously been connected to the data processing apparatus and to which content data has previously been transmitted, from among the plurality of external apparatuses found in the search by the search unit.

4. The apparatus according to claim 1,
   wherein the external apparatus, in a case of performing communication using the first connection manner, is capable of executing the predetermined function with respect to the data processing apparatus, and
   in a case of performing communication using the second connection manner, is capable of executing only a specific function with respect to the data processing apparatus.

5. The apparatus according to claim 1,
   wherein the search unit transmits a search request for searching for an external apparatus capable of executing the predetermined function,
   transmits an acquisition request for device information to an external apparatus that responds to the search request, and
   receives the device information from an external apparatus that responds to the acquisition request.

6. The apparatus according to claim 5, wherein the search request includes a search request for an external apparatus to join the network and a search request for an external apparatus capable of executing the predetermined function.

7. The apparatus according to claim 5, further comprising:
   a recording unit configured to record image data held by the data processing apparatus; and
   a storage unit configured to store information regarding an external apparatus that has been connected to previously and to which image data has been transmitted previously,
   wherein the control unit determines whether or not the external apparatus has been connected to previously and image data has been transmitted to the external apparatus previously, by comparing information stored in the storage unit with the device information received from the external apparatus.

8. The apparatus according to claim 1, wherein the control unit, in a case where the external apparatus selected by the selection unit has been connected to previously and image data has been transmitted to the external apparatus previously, ends the search performed by the search unit, and gives notice to the external apparatus to perform connection processing according to the first connection manner.

9. The apparatus according to claim 1,
   wherein the predetermined function includes at least one of a function for capturing an image, a function for transmitting an image, a function for displaying an image, and a function for printing an image, and
   the specific function is a function for transmitting image data to an external apparatus.

10. A method of controlling a data processing apparatus having a communication unit configured to communicate with an external apparatus, using any of a plurality of communication manners including a first connection manner via a network and a second connection manner that is different from the first connection manner, the method comprising:
    searching for an external apparatus that is capable of executing a predetermined function for transmitting an image;
    selecting an external apparatus found in the search as a connection-target device;
    determining if the selected external apparatus has been connected to previously; and
    controlling the communication unit such that, in a case where it is determined that the selected external apparatus has been connected to previously and image data has been transmitted to the external apparatus previously, communication is performed with the external apparatus using the first connection manner, and
    controlling the communication unit such that, in a case where it is determined that image data has not been transmitted to the external apparatus previously, communication is performed with the external apparatus using the second connection manner,
    wherein in the first connection manner the external apparatus is controlled to start up an application, and to perform communication via a wireless network formed by an access point and to make a plurality of functions including the predetermined function executable using the application, and in the second connection manner the external apparatus is controlled to perform communication by a direct connection without starting up the application, and to make the predetermined function executable.

11. A non-transitory computer-readable storage medium storing a program for causing a computer to execute a method of controlling a data processing apparatus having a communication unit configured to communicate with an external apparatus, using any of a plurality of communication manners including a first connection manner via a network and a second connection manner that is different from the first connection manner, the method comprising:
    searching for an external apparatus that is capable of executing a predetermined function for transmitting an image;
    selecting an external apparatus found in the search as a connection-target device;
    determining if the selected external apparatus has been connected to previously; and
    controlling the communication unit such that, in a case where it is determined that the selected external apparatus has been connected to previously and image data has been transmitted to the external apparatus previously, communication is performed with the external apparatus using the first connection manner, and
    controlling the communication unit such that, in a case where it is determined that image data has not been transmitted to the external apparatus previously, communication is performed with the external apparatus using the second connection manner,
wherein in the first connection manner the external apparatus is controlled to start up an application, and to perform communication via a wireless network formed by an access point and to make a plurality of functions including the predetermined function executable using the application, and in the second connection manner the external apparatus is controlled to perform communication by a direct connection without starting up the application, and to make the predetermined function executable.

* * * * *